Jan. 24, 1928.
C. C. MITCHELL ET AL
1,657,023
DEVICE FOR INFLATING MOTOR VEHICLE TIRES
Filed June 12, 1926   2 Sheets-Sheet 2
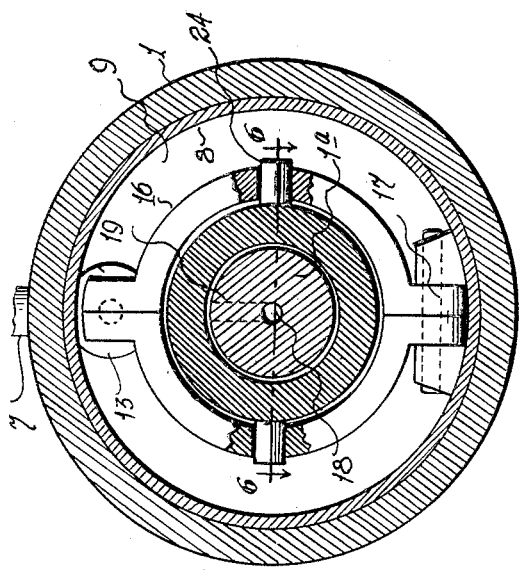
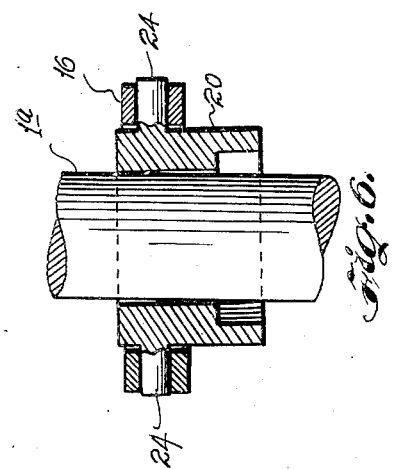
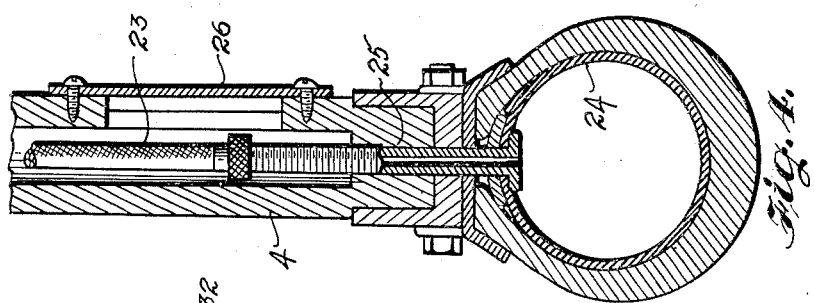
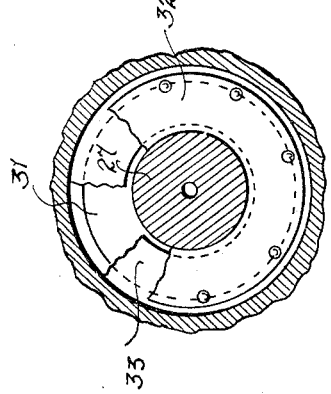
Bige Gregory
Clarence C. Mitchell
*INVENTORS*
BY John M. Spellman
*ATTORNEY.*

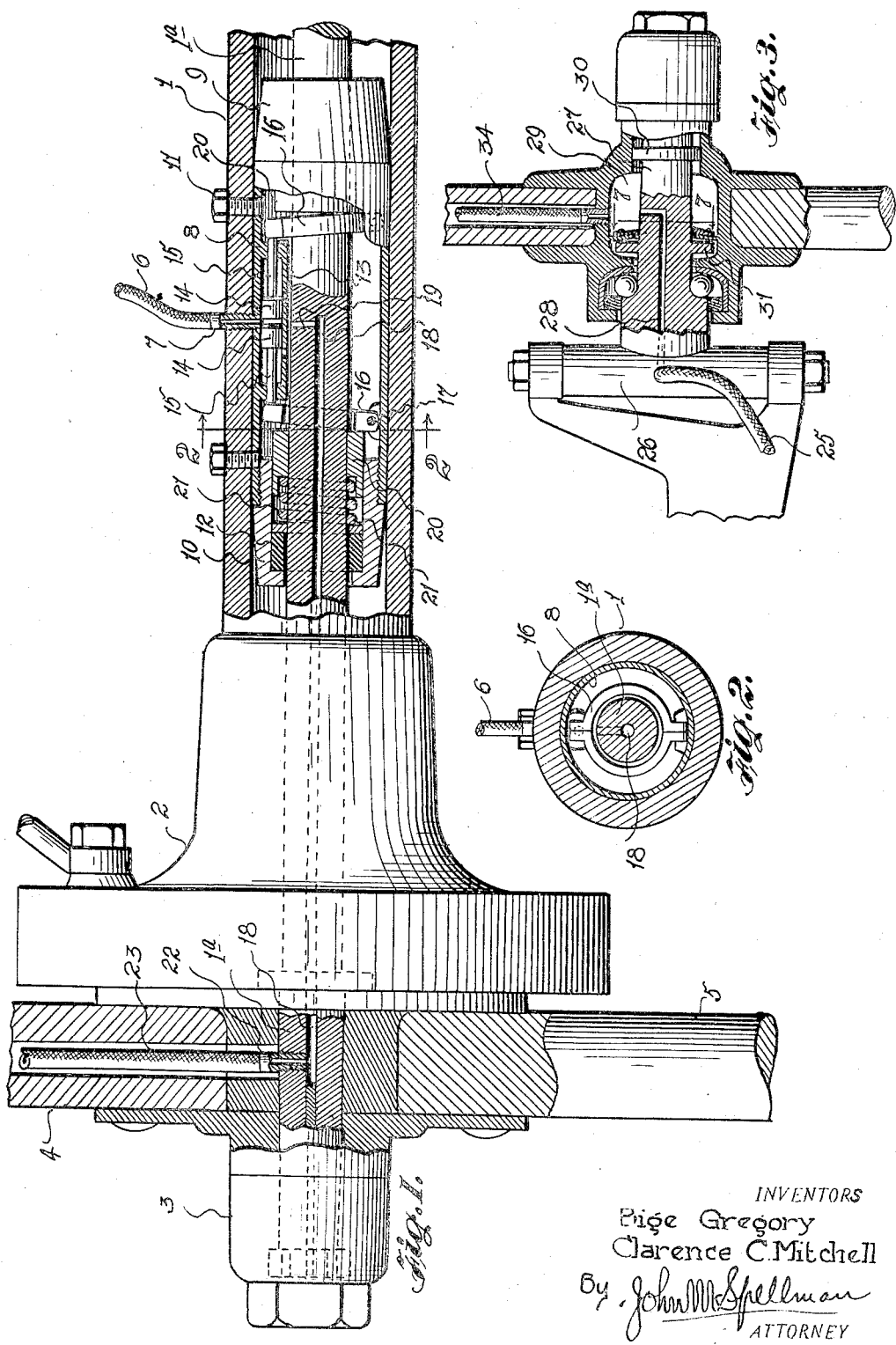

Patented Jan. 24, 1928.

1,657,023

UNITED STATES PATENT OFFICE.

CLARENCE C. MITCHELL AND BIGE GREGORY, OF VERNON, TEXAS, ASSIGNORS OF FIVE-SIXTEENTHS TO CHARLEY E. MORRISON, OF VERNON, TEXAS.

DEVICE FOR INFLATING MOTOR-VEHICLE TIRES.

Application filed June 12, 1926. Serial No. 115,479.

This invention relates to improvements in means for inflating tires of motor vehicles and the particular object thereof is to provide a device of this nature for inflating tires while the vehicle is in motion or stationary without the necessity of the driver of the vehicle moving from his seat.

The invention resides further in the novel and practical manner in which the device is arranged and installed upon the motor vehicle and in the simplicity of its operation, combined with its strength and durability.

With the foregoing and other minor yet important objects in view the invention will be better understood from a perusal of the following detailed description taken in connection with the accompanying drawings forming part hereof and in which—

Figure 1 is an elevational view partly in section of a portion of a rear motor vehicle axle including the hub and adjoining spokes and illustrating an embodiment of the invention.

Figure 2 is a cross-sectional view on line 2—2 of Figure 1.

Figure 3 is an elevational view partly in section of the front hub and adjoining parts and illustrating the manner of installation of the invention to the front tires and wheels.

Figure 4 is a partial vertical sectional view through a motor vehicle wheel, tire and spoke, showing the manner of embodiment therein.

Figure 5 is an enlarged cross-sectional view similar to Figure 2, but illustrating a modification of the device.

Figure 6 is a partial longitudinal sectional view along line 6—6 of Figure 5; and Figure 7 is a cross-sectional view on line 7—7 of Figure 3.

Proceeding in accordance with the drawings wherein numerals indicate the various parts, 1 denotes the rear axle housing of a motor vehicle with axle 1ª, 2 the hub and 3 the cap of the hub. From the hub in Figure 1 are shown parts of spokes 4 and 5, the spoke 4 being channeled and hereinafter more specifically referred to.

For the purpose of conveying compressed air from a storage tank or from a pump connection to inflate the tires, there is provided a tube or hose 6 leading from the air tank or pump, the air control being from the dashboard of the vehicle and having connection to the axle housing 1 by means of a threaded nipple 7.

The nipple 7 is also connected into a barrel or tubular member 8, having end closures 9 and 10 and securely attached to the axle housing 1 by screws 11 or in any preferred manner. The barrel 8 including its end closures 9 and 10 embraces the axle 1ª. These end closures are threaded into the barrel for the purpose of removal when necessary and each includes a rubber gasket 12 snugly seated around the axle.

Included within the barrel 8 is a longitudinal and cylindrical chamber 13 provided with pistons 14. The pistons are oppositely opposed and have rods 15 traversing the ends of the chamber and have communication with the yokes 16. The yokes are hinged at 17 to the bottom wall of the barrel 8 in order to provide loose sliding movement on the axle 1ª.

The description thus far sets out the manner of enabling the air to enter the axle 1, which is channeled at 18 and 19. Means must, however, be provided for preventing the air under compression from the storage tank or pump from escaping between the axle and barrel and this is taken care of by the cylindrical plugs 20, one in each end of the barrel. Between each plug and the gaskets 12 are springs 21. Hence air under compression and entering the channels 18 and 19 will force the pistons apart, move the yokes against the springs, thus compressing the gaskets and causing a tight embrace at the gaskets around the axle. Consequently, even though the vehicle is in motion, no air to any appreciable extent will escape. In normal inoperative position, of course, the springs will retract and relieve the pressure on the gaskets, permitting them to resume normal shape thus leaving a small annular space between the axle and the gaskets for the free and non-frictional rotation of the axle.

The air having entered the axle 1ª is conducted through the hub to an outlet 22 thence through the tube 23 to the inner tube 24 by means of the regular inner tube member 25. In Figure 4 it will be observed that one spoke 4 is hollowed for the reception of the tube 23 and has a removable plate 26 forming a closure for an opening in the spoke for gaining access to the tube 25. The channel 18 terminates just beyond the outlet 22 causing the air to enter the tire or tube 24. Obviously both of the rear wheels are arranged in the same manner including the opposite side or end of the axle and its housing 1 and 1ª.

In Figure 5 is illustrated a modification of the yoke 16 which in this case is divided into equal portions. In this arrangement the member 20 in which rests one end of the spring 21 is provided with pins 24 which engage loosely with apertures in the yoke 16. In this way the yoke is permitted to ride more freely and loosely on the axle and prevent any chance of its binding or jamming. As shown in Figure 6 the member 20 may occupy a position with its bore at an irregular angle to the axle 1ª if necessary to permit it to be perfectly free from catching or hanging.

The front tires of the vehicle are connected into the air line by means of the tube 25 which is connected to the pivot rod 26. This rod is channeled and the spindle 27 likewise channeled at 28 for the air and an air chamber 29 provided. To prevent the escape of air under pressure this chamber is sealed by a ring 30 and a similar ring 31 formed on the spindle at its opposite side. A rubber diaphragm 32 of rubber or suitable material tightly secured to an annular flange 33 formed in the top of the chamber 29 and this arangement provides an air tight closure to prevent escape of air when applied under pressure in inflating the front tube or tire.

The spoke in the front wheel arrangement is also hollowed for a tube 34 from the air tank or pump.

When air under pressure is applied to the front tire, the chamber being filled will press the diaphragm 32 upon the flange 33 and seal the opening between the flange 33 and diaphragm 32. In normal inoperative position, however, this diaphragm will be free from engagement with the flange 33 and no friction will result.

From the above and foregoing it will be apparent that the device provides a novel means for inflating tires of motor vehicles while the vehicle is in motion or at rest. Obviously changes and modifications may be made in the arrangement and construction of the invention without departing from the spirit and meaning of the appended claims.

We claim:

1. A pneumatic tire inflating device comprising in combination with the rear axle and housing of a motor vehicle of a barrel, end closures therefor, openings in each of said end closures through which said axle traverses, a gasket in each of said end closures of the barrel, slidable plugs or collars movable on the axle and under spring tension and means for moving said plugs or collars against said gaskets to seal the barrel against air leakage when air is applied.

2. A pneumatic tire inflating device as set out in claim 1 and wherein said barrel includes a tubular member in which are arranged oppositely disposed pistons; an opening through said housing and registering with said tubular member to admit air under compression to move said collars or plugs against said gaskets.

In testimony whereof we affix our signatures.

CLARENCE C. MITCHELL.
BIGE GREGORY.